(12) United States Patent
Suzuki et al.

(10) Patent No.: US 8,221,935 B2
(45) Date of Patent: Jul. 17, 2012

(54) FUEL CELL STACK

(75) Inventors: Masaharu Suzuki, Utsunomiya (JP); Go Morimoto, Utsunomiya (JP); Katsuhiko Kohyama, Tsurugashima (JP); Ayumu Ishizuka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 12/405,757

(22) Filed: Mar. 17, 2009

(65) Prior Publication Data

US 2009/0233139 A1 Sep. 17, 2009

(30) Foreign Application Priority Data

Mar. 17, 2008 (JP) ................................. 2008-067696

(51) Int. Cl.
*H01M 8/10* (2006.01)

(52) U.S. Cl. ........ 429/507; 429/458; 429/467; 429/468; 429/469; 429/470; 429/511

(58) Field of Classification Search .................... 429/35, 429/458, 467–470, 507, 511

See application file for complete search history.

(56) References Cited

U.S. PATENT DOCUMENTS

| 6,372,372 | B1 * | 4/2002 | D'Aleo et al. ................. 429/34 |
| 2007/0218332 | A1 | 9/2007 | Suzuki et al. | |

FOREIGN PATENT DOCUMENTS

| JP | 2000-164238 | | 6/2000 |
| JP | 2005-100755 | * | 4/2005 |
| JP | 2007-273447 | | 10/2007 |

* cited by examiner

*Primary Examiner* — Patrick Joseph Ryan
*Assistant Examiner* — Ladan Mohaddes
(74) *Attorney, Agent, or Firm* — Nelson Mullins Riley & Scarborough LLP; Anthony A. Laurentano

(57) ABSTRACT

A coolant inlet manifold for coolant supply passages is attached to an end plate of a fuel cell stack. Pillars are provided on at least one end of the coolant inlet manifold in a longitudinal direction thereof. The pillars are fitted into through holes formed in the end plate, and are connected to a manifold body and to a connector.

6 Claims, 8 Drawing Sheets

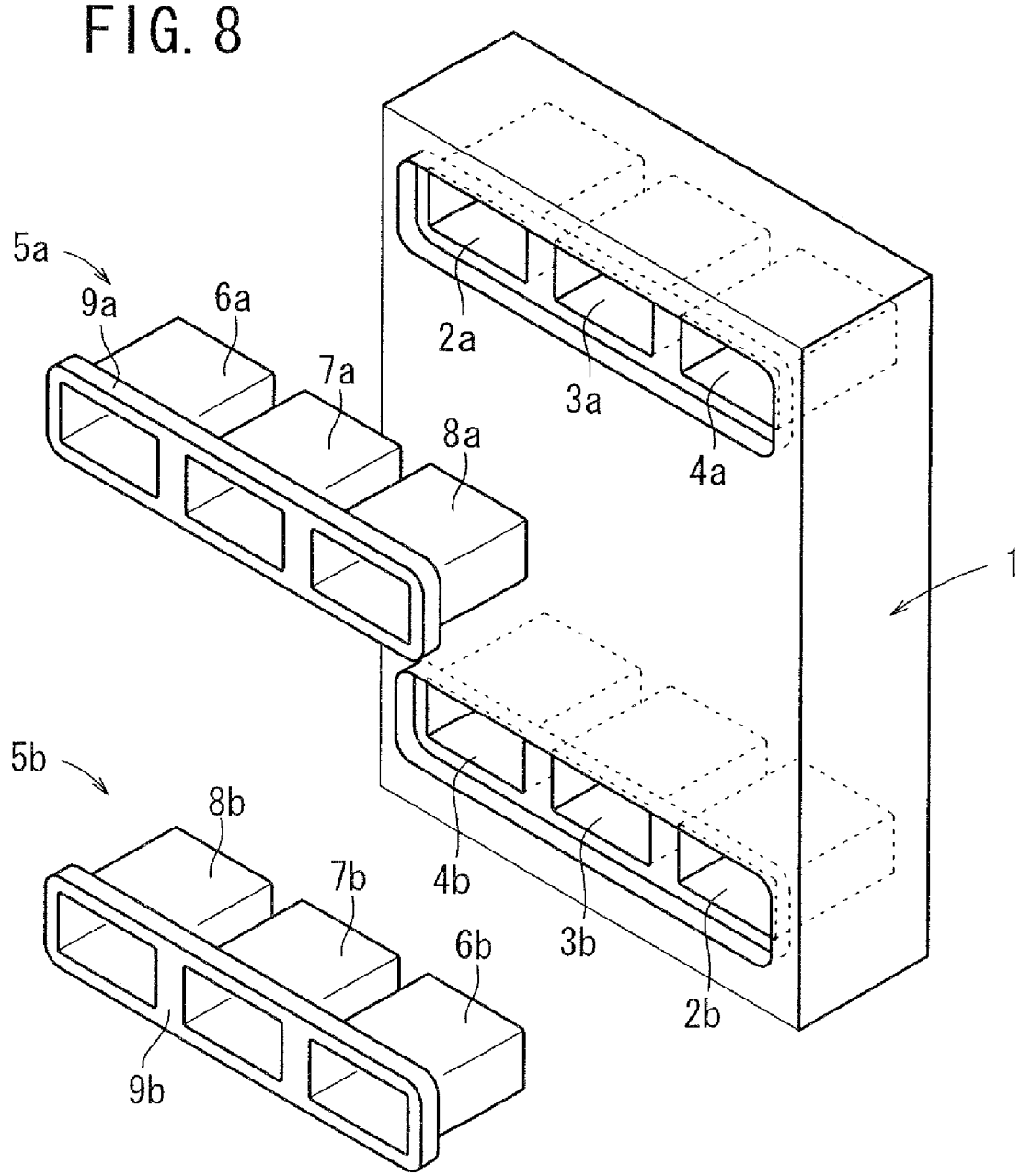

FUEL CELL STACK

BACKGROUND OF THE INVENTION

1. Field of the Invention

The present invention relates to a fuel cell stack formed by stacking a membrane electrode assembly and separators in a stacking direction. The membrane electrode assembly includes a pair of electrodes and an electrolyte membrane interposed between the electrodes. The fuel cell stack includes rectangular end plates provided at opposite ends in the stacking direction. Passages that function at least as fluid supply passages or fluid discharge passages for a coolant or a reactant gas are formed along the end plates in a longitudinal direction, and extend through the fuel cell stack.

2. Description of the Related Art

A solid polymer electrolyte fuel cell, for example, employs a membrane electrode assembly, which includes an anode, a cathode, and an electrolyte membrane interposed between the anode and the cathode. The electrolyte membrane comprises a polymer ion exchange membrane. The membrane electrode assembly is sandwiched between separators to form a power generating cell. During use, a predetermined number of such power generating cells are stacked together, and end plates are provided at opposite ends in the stacking direction to thereby form a fuel cell stack.

In the fuel cell, a fuel gas flow field for supplying a fuel gas to the anode and an oxygen-containing gas flow field for supplying an oxygen-containing gas to the cathode are formed in surfaces of the separators. Further, a coolant flow field for a coolant is formed along surfaces of the separators.

In the end plate, which is provided on at least one end in the stacking direction, there are provided a fuel gas supply passage for supplying the fuel gas to the fuel gas flow field, a fuel gas discharge passage for discharging the fuel gas, after consumption thereof, from the fuel gas flow field, an oxygen-containing gas supply passage for supplying an oxygen-containing gas to the oxygen-containing gas flow field, an oxygen-containing gas discharge passage for discharging the oxygen-containing gas, after consumption thereof, from the oxygen-containing gas flow field, a coolant supply passage for supplying the coolant to the coolant flow field, and a coolant discharge passage for discharging the coolant used for cooling from the coolant flow field.

For example, in the fuel cell disclosed in Japanese Laid-Open Patent Publication No. 2000-164238, as shown in FIG. 8, a fuel gas supply through hole $2a$, a coolant water supply through hole $3a$, and an oxygen-containing gas supply through hole $4a$ are provided at an end of one of the pressure plates (end plates) 1, whereas a fuel gas discharge through hole $2b$, a coolant water discharge through hole $3b$, and an oxygen-containing gas discharge through hole $4b$ are provided at the other end of the pressure plate 1.

An inlet hole assembly pipe $5a$ and an outlet hole assembly pipe $5b$ are attached to the pressure plate 1. The inlet hole assembly pipe $5a$ includes a fuel gas inlet hole pipe $6a$ fitted to the fuel gas supply through hole $2a$, a coolant water inlet hole pipe $7a$ fitted to the coolant water supply through hole $3a$, and an oxygen-containing gas inlet hole pipe $8a$ fitted to the oxygen-containing gas supply through hole $4a$. The fuel gas inlet hole pipe $6a$, the coolant water inlet hole pipe $7a$, and the oxygen-containing gas inlet hole pipe $8a$ are connected together by a frame $9a$.

The outlet hole assembly pipe $5b$ includes a fuel gas outlet hole pipe $6b$ fitted to the fuel gas discharge through hole $2b$, a coolant water outlet hole pipe $7b$ fitted to the coolant water discharge through hole $3b$, and an oxygen-containing gas outlet hole pipe $8b$ fitted to the oxygen-containing gas discharge through hole $4b$. The fuel gas outlet hole pipe $6b$, the coolant water outlet hole pipe $7b$, and the oxygen-containing gas outlet hole pipe $8b$ are connected together by a frame $9b$.

In Japanese Laid-Open Patent Publication No. 2000-164238, due to the internal pressure of the fuel cell stack, bending stresses are applied to the pressure plate 1, and the pressure plate 1 may become deformed undesirably. In particular, in the event that the pressure plate 1 has a rectangular shape, a relatively large deformation may occur in the longitudinal direction thereof.

In such a structure, where the inlet hole assembly pipe $5a$ and the outlet hole assembly pipe $5b$ are made of resin and are provided along the pressure plate 1 in the longitudinal direction, at ends in the longitudinal direction of the inlet hole assembly pipe $5a$ and the outlet hole assembly pipe $5b$, forces in opposition to the bending force tend to be generated easily, due to the rigidity of the resin. Thus, the ends of the inlet hole assembly pipe $5a$ and the outlet hole assembly pipe $5b$ may peel off from the pressure plate 1, and cracks or the like may occur at ends of the inlet hole assembly pipe $5a$ and the outlet hole assembly pipe $5b$.

SUMMARY OF THE INVENTION

A general object of the present invention is to provide a fuel cell stack, in which it is possible to reliably prevent a resin manifold member provided along a rectangular end plate in a longitudinal direction from becoming peeled off from the end plate.

The present invention relates to a fuel cell stack formed by stacking a membrane electrode assembly and separators in a stacking direction. The membrane electrode assembly includes a pair of electrodes and an electrolyte membrane interposed between the electrodes. The fuel cell stack includes rectangular end plates provided at opposite ends in the stacking direction. Passages that function at least as fluid supply passages or fluid discharge passages for a coolant or a reactant gas are formed along the end plates in a longitudinal direction, and extend through the fuel cell stack.

A resin manifold member is connected to any of the passages, and extends along one of the end plates in the longitudinal direction thereof.

A reinforcement member is provided on at least one end of the resin manifold member in the longitudinal direction, for preventing the resin manifold member from peeling off from the end plate.

In the present invention, even if a load or the like is applied to one of the end plates, and the end plate is deformed in the longitudinal direction, due to the reinforcement member being provided on at least one end of the resin manifold member in the longitudinal direction, it is possible to reliably prevent the resin manifold member from peeling off from the end plate. Thus, a desired sealing performance can be maintained, and it is possible to suitably prevent cracks or the like from forming in the resin manifold member.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a partial perspective view showing the fuel cell disclosed in Japanese Laid-Open Patent Publication No. 2000-164238.

DESCRIPTION OF THE PREFERRED EMBODIMENTS

Figure 1:
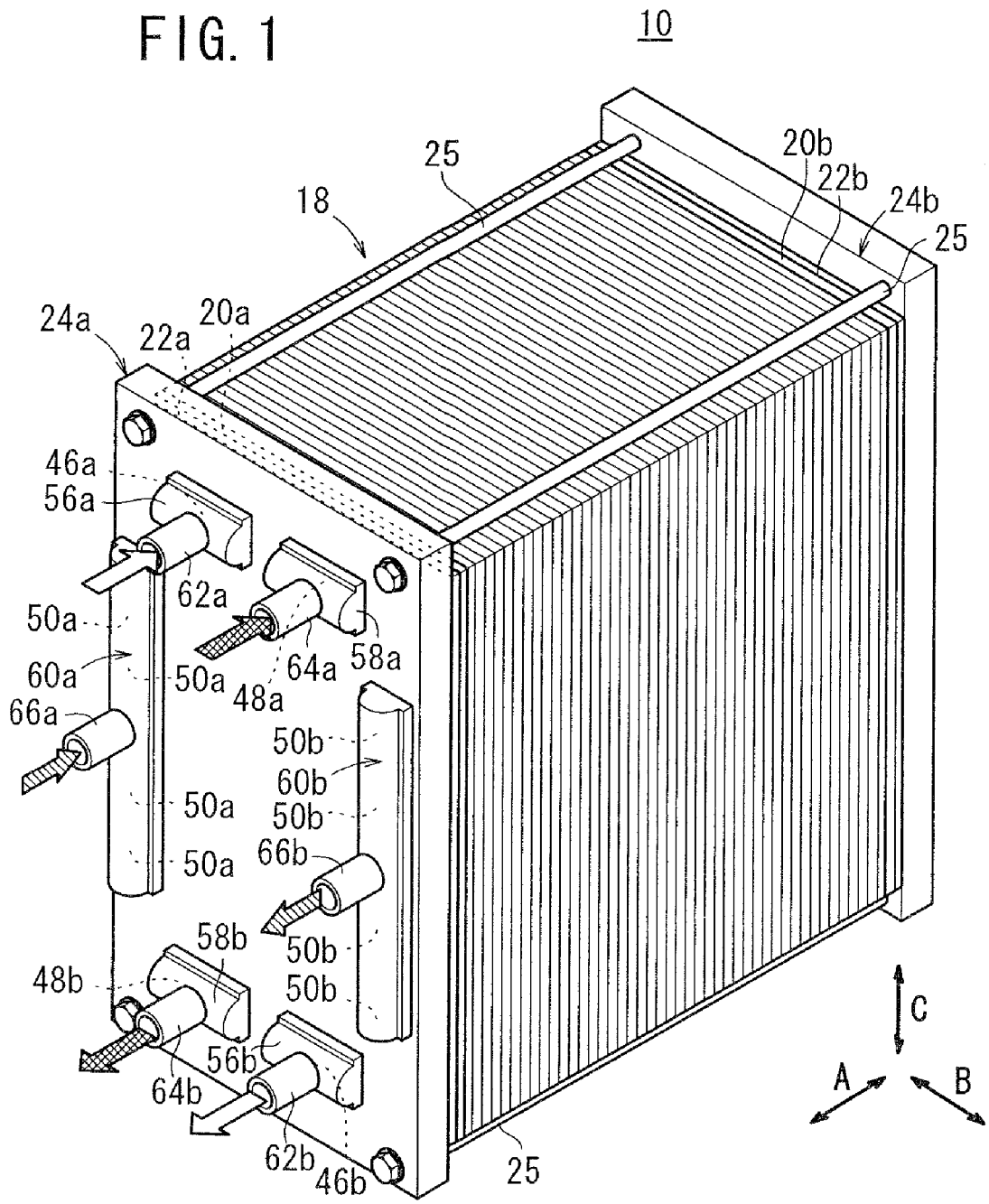
FIG. 1 is a schematic perspective view showing a fuel cell stack according to a first embodiment of the present invention.
Figure 2:
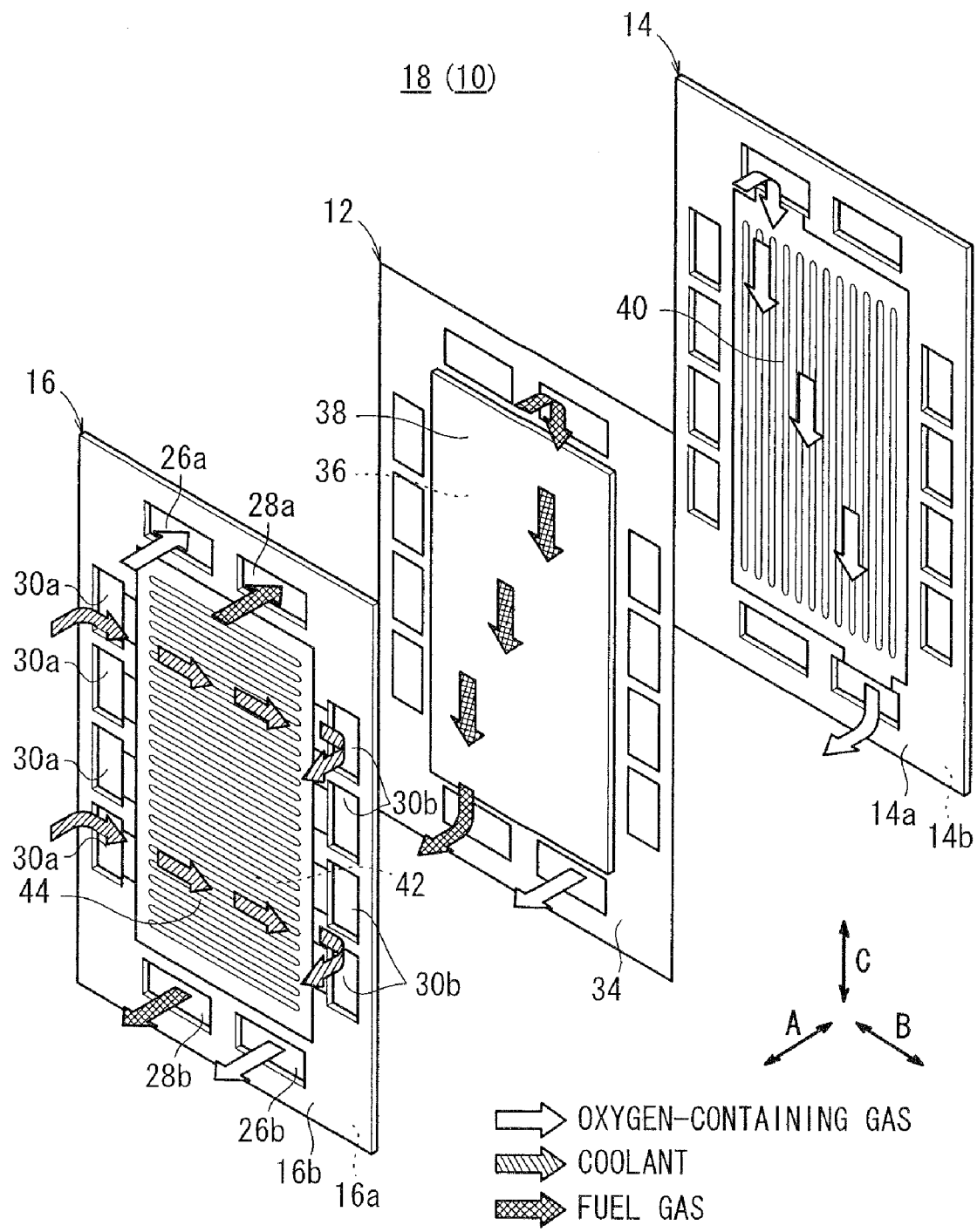
FIG. 2 is a schematic exploded perspective view showing main components of the fuel cell stack.

FIG. 1 is a schematic perspective view showing a fuel cell stack 10 according to a first embodiment of the present invention. FIG. 2 is a schematic exploded perspective view showing main components of the fuel cell stack 10.

As shown in FIG. 2, the fuel cell stack 10 is formed by stacking unit cells (fuel cells) 18 in the direction indicated by the arrow A. Each of the unit cells 18 has a membrane electrode assembly 12, with first and second separators 14, 16 sandwiching the membrane electrode assembly 12 therebetween. The first separator 14 and the second separator 16 are carbon separators. Instead of carbon separators, metal separators may also be used for the first separator 14 and the second separator 16.

As shown in FIG. 1, terminal plates 20a, 20b are provided at opposite ends of the unit cell 18 in the direction indicated by the arrow A. Insulating plates 22a, 22b are provided outside of the terminal plates 20a, 20b. End plates 24a, 24b are provided outside of the insulating plates 22a, 22b. The end plates 24a, 24b may be made of a lightweight metal, such as aluminum or magnesium, for example.

In the fuel cell stack 10, the end plates 24a, 24b have a rectangular shape, for example. Components between the end plates 24a, 24b are tightened together using tie-rods 25, which extend in the direction indicated by the arrow A. Alternatively, the components of the fuel cell stack 10 may be held together using a box-shaped casing (not shown) including the end plates 24a, 24b.

As shown in FIG. 2, the first separator 14 and the second separator 16 have an elongated shape, including elongate sides that extend in the direction of gravity, as indicated by the arrow C, and short sides extending in a horizontal direction, as indicated by the arrow B.

An oxygen-containing gas supply passage 26a for supplying an oxygen-containing gas, and a fuel gas supply passage 28a for supplying a fuel gas are provided at an upper end of the unit cell 18, in the longitudinal direction indicated by the arrow C. The oxygen-containing gas supply passage 26a and the fuel gas supply passage 28a extend through the unit cell 18 in the direction indicated by the arrow A.

A fuel gas discharge passage 28b for discharging the fuel gas and an oxygen-containing gas discharge passage 26b for discharging the oxygen-containing gas are provided at a lower end of the unit cell 18 in the longitudinal direction. The fuel gas discharge passage 28b and the oxygen-containing gas discharge passage 26b extend through the unit cell 18 in the direction indicated by the arrow A.

Four coolant supply passages 30a for supplying a coolant are provided at one end of the unit cell 18, in the lateral direction indicated by the arrow B. Four coolant discharge passages 30b for discharging the coolant are provided at the other end of the unit cell 18, in the lateral direction indicated by the arrow B. The coolant supply passages 30a and the coolant discharge passages 30b extend through the unit cell 18 in the direction indicated by the arrow A.

The membrane electrode assembly 12 comprises a cathode 36, an anode 38, and a solid polymer electrolyte membrane 34 interposed between the cathode 36 and the anode 38. The solid polymer electrolyte membrane 34 is created by impregnating a thin membrane formed of perfluorosulfonic acid with water, for example.

Each of the cathode 36 and the anode 38 has a gas diffusion layer (not shown), such as carbon paper, and an electrode catalyst layer (not shown) made of a platinum alloy supported on porous carbon particles. The carbon particles are deposited uniformly on the surface of the gas diffusion layer. The electrode catalyst layers of the cathode 36 and the anode 38 are fixed to both surfaces of the solid polymer electrolyte membrane 34, respectively.

The first separator 14 has an oxygen-containing gas flow field 40 on a surface 14a thereof facing the membrane electrode assembly 12. The oxygen-containing gas flow field 40 is connected to the oxygen-containing gas supply passage 26a and to the oxygen-containing gas discharge passage 26b. The oxygen-containing gas flow field 40 extends vertically in the direction indicated by the arrow C.

The second separator 16 has a fuel gas flow field 42 on a surface 16a thereof facing the membrane electrode assembly 12. The fuel gas flow field 42 is connected to the fuel gas supply passage 28a and to the fuel gas discharge passage 28b. The fuel gas flow field 42 extends in the direction indicated by the arrow C.

A coolant flow field 44 is formed between a surface 16b of the second separator 16 and a surface 14b of the first separator 14. The coolant flow field 44 is connected to the coolant supply passages 30a and to the coolant discharge passages 30b. The coolant flow field 44 extends in the direction indicated by the arrow B.

Although not shown, seal members are provided between the membrane electrode assembly 12 and the first and second separators 14, 16, as well as between adjacent first and second separators 14, 16 (i.e., between adjacent unit cells 18).

Figure 3:
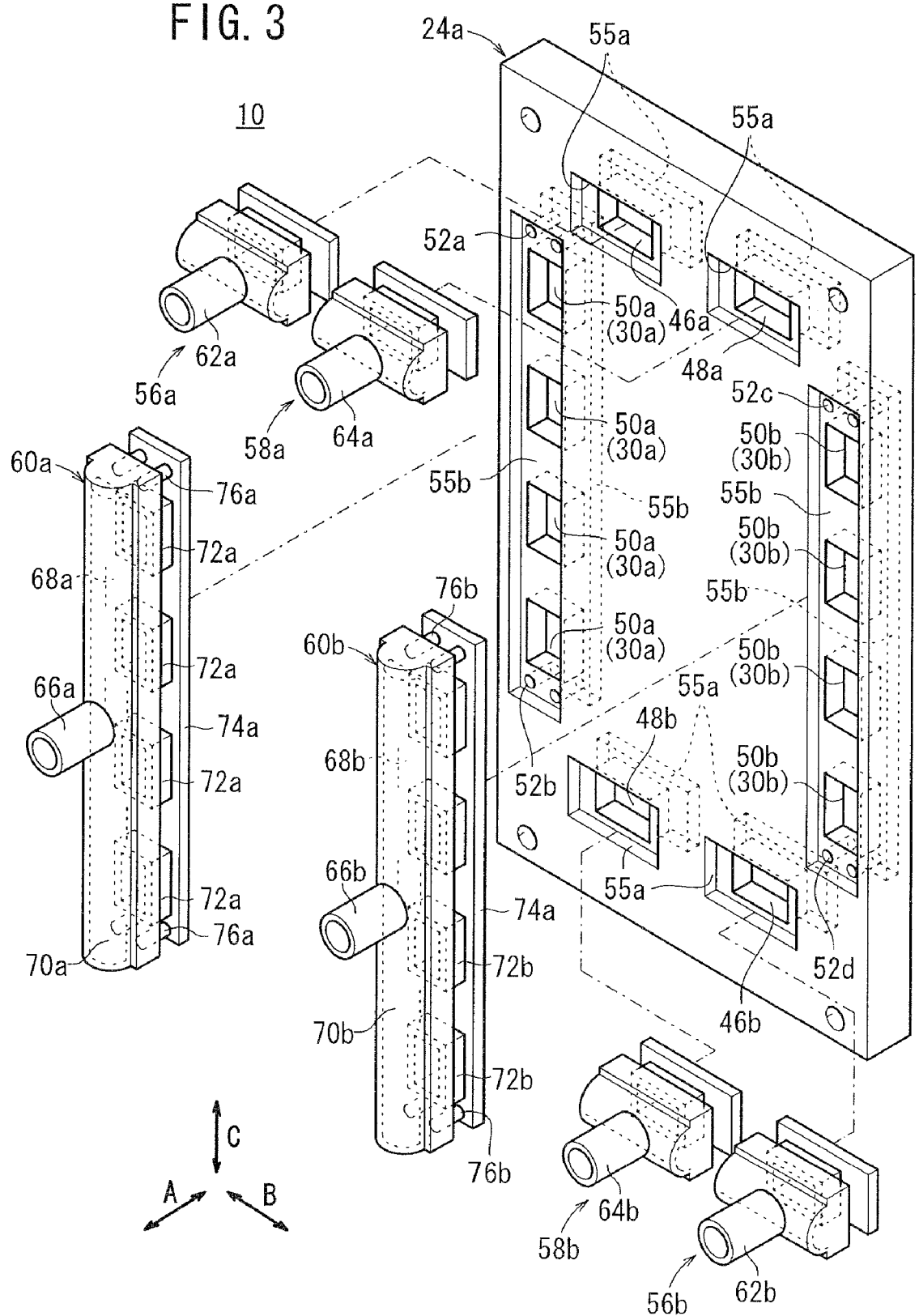
FIG. 3 is an exploded perspective view showing an end plate of the fuel cell stack, a coolant inlet manifold, and a coolant outlet manifold.

As shown in FIG. 3, at upper and lower ends in the vertical direction of the end plate 24a, an oxygen-containing gas inlet 46a connected to the oxygen-containing gas supply passage 26a, a fuel gas inlet 48a connected to the fuel gas supply passage 28a, an oxygen-containing gas outlet 46b connected to the oxygen-containing gas discharge passage 26b, and a fuel gas outlet 48b connected to the fuel gas discharge passage 28b are provided.

At opposite ends in the lateral direction of the end plate 24a, coolant inlets 50a connected to the coolant supply passages 30a, and coolant outlets 50b connected to the coolant discharge passages 30b are provided. At opposite ends of the end plate 24a, in the longitudinal direction thereof, as indicated by the arrow C, respective pairs of through holes 52a and 52b are provided adjacent to the coolant inlets 50a, whereas respective pairs of through holes 52c and 52d are provided adjacent to the coolant outlets 50b.

Grooves 55a are provided on both surfaces of the end plate 24a, around the oxygen-containing gas inlet 46a, the fuel gas inlet 48a, the oxygen-containing gas outlet 46b, and the fuel gas outlet 48b. Further, grooves 55b are provided on both surfaces of the end plate 24a, around the coolant inlets 50a and the coolant outlets 50b.

As shown in FIGS. 1 and 3, an oxygen-containing gas inlet manifold 56a connected to the oxygen-containing gas inlet 46a, a fuel gas inlet manifold 58a connected to the fuel gas inlet 48a, an oxygen-containing gas outlet manifold 56b connected to the oxygen-containing gas outlet 46b, and a fuel gas outlet manifold 58b connected to the fuel gas outlet 48b are attached to the end plate 24a, at opposite ends thereof in the vertical direction.

A coolant inlet manifold 60a connected to the coolant inlets 50a, and a coolant outlet manifold 60b connected to the coolant outlets 50b are attached to the end plate 24a, at opposite ends thereof in the lateral direction. The coolant inlet manifold 60a and the coolant outlet manifold 60b extend along the end plate 24a in the longitudinal direction thereof.

The oxygen-containing gas inlet manifold 56a, the fuel gas inlet manifold 58a, the oxygen-containing gas outlet manifold 56b, the fuel gas outlet manifold 58b, the coolant inlet manifold 60a, and the coolant outlet manifold 60b each are made up of resin manifold members. Pipe channels 62a, 64a, 62b, 64b, 66a, 66b are provided at respective centers of the oxygen-containing gas inlet manifold 56a, the fuel gas inlet manifold 58a, the oxygen-containing gas outlet manifold 56b, the fuel gas outlet manifold 58b, the coolant inlet manifold 60a, and the coolant outlet manifold 60b.

Figure 4:
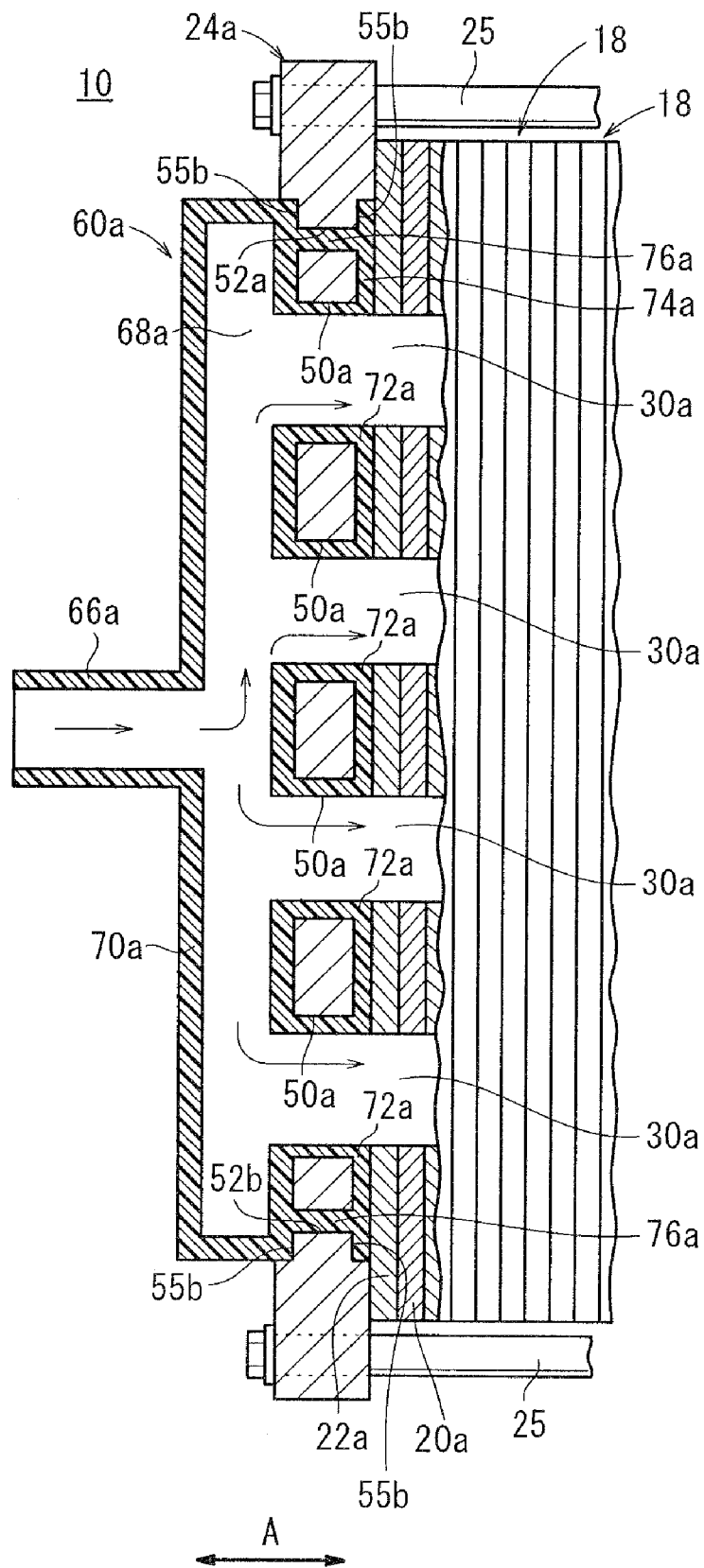
FIG. 4 is a cross sectional view showing the end plate and the coolant inlet manifold.
Figure 5:
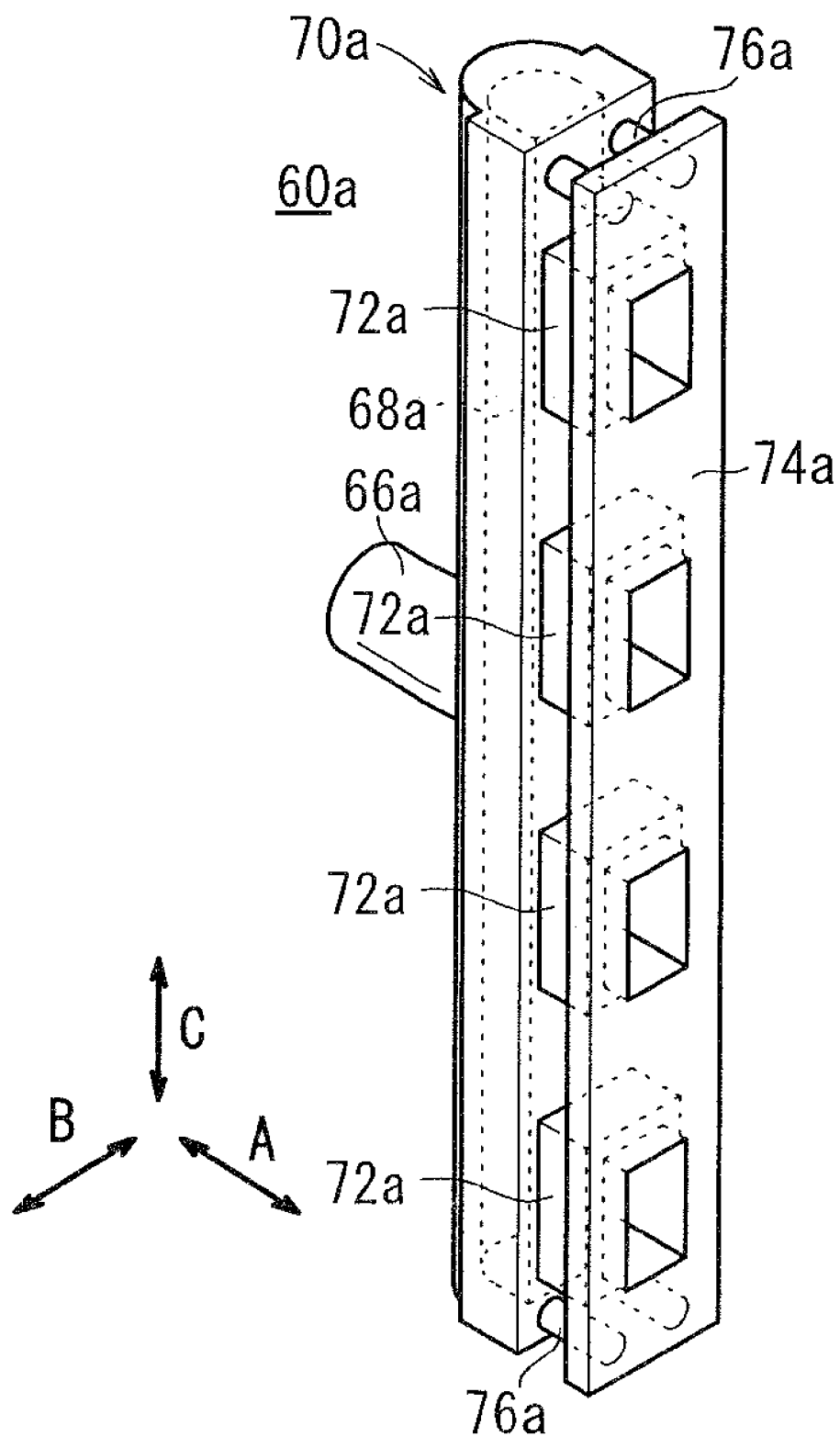
FIG. 5 is a perspective view showing the coolant inlet manifold.

As shown in FIGS. 3 to 5, the coolant inlet manifold 60a includes a single manifold chamber 68a connected to the coolant supply passages 30a and extending in the longitudinal direction. Further, the coolant inlet manifold 60a includes a manifold body 70a, which is inserted into the groove 55b formed on one surface (outer side) of the end plate 24a.

The manifold body 70a is combined with ends of four insertion units 72a on one side thereof. Other ends of the insertion units 72a, on the other side thereof, are combined with a substantially plate shaped connector 74a. The insertion units 72a are inserted into the four coolant inlets 50a of the end plate 24a. The connector 74a is inserted into the groove 55b formed on the other surface side (unit cell 18 side) of the end plate 24a.

Pillars (reinforcement units) 76a are provided at opposite ends in the longitudinal direction of the coolant inlet manifold 60a. The pillars 76a are fitted into respective pairs of through holes 52a, 52b of the end plate 24a, and are connected respectively to the manifold body 70a and to the connector 74a.

Alternatively, each end plate 24a may have one through hole 52a and one pillar 76a, at each of opposite ends in the longitudinal direction of the coolant inlet manifold 60a. Further, two pillars 76a or one pillar 76a may be provided at only one of the opposite ends in the longitudinal direction of the coolant inlet manifold 60a.

The coolant outlet manifold 60b has the same structure as the coolant inlet manifold 60a. Constituent components having identical structures are labeled with the same reference numerals, and detailed descriptions of such features have been omitted.

Next, operations of the fuel cell stack 10 having the above structure shall be described.

First, as shown in FIG. 1, in the fuel cell stack 10, an oxygen-containing gas is supplied to the oxygen-containing gas inlet manifold 56a, whereas a fuel gas such as a hydrogen-containing gas is supplied to the fuel gas inlet manifold 58a. Further, a coolant such as pure water and ethylene glycol is supplied to the coolant inlet manifold 60a.

As shown in FIG. 2, the oxygen-containing gas flows from the oxygen-containing gas supply passage 26a of each of the unit cells 18 into the oxygen-containing gas flow field 40 of the first separator 14. The oxygen-containing gas flows downwardly along the cathode 36 of the membrane electrode assembly 12.

The fuel gas flows from the fuel gas supply passage 28a of each of the unit cells 18 into the fuel gas flow field 42 of the second separator 16. The fuel gas flows downwardly along the anode 38 of the membrane electrode assembly 12.

As described above, in each of the membrane electrode assemblies 12, oxygen-containing gas supplied to the cathode 36 and fuel gas supplied to the anode 38 are consumed in an electrochemical reaction at catalyst layers of the cathode 36 and the anode 38, for thereby generating electricity.

Then, the oxygen-containing gas consumed at the cathode 36 is discharged from the oxygen-containing gas discharge passage 26b into the oxygen-containing gas outlet manifold 56b (see FIG. 1). Likewise, the fuel gas consumed at the anode 38 is discharged from the fuel gas discharge passage 28b into the fuel gas outlet manifold 58b.

Further, as shown in FIG. 4, after the coolant has been supplied to the manifold chamber 68a of the coolant inlet manifold 60a, the coolant flows separately into four insertion units 72a. The insertion units 72a are connected to the coolant supply passages 30a. Therefore, as shown in FIG. 2, the coolant supplied to the coolant supply passages 30a flows into the coolant flow field 44 disposed between the first and second separators 14, 16.

The coolant flows in a horizontal direction as indicated by the arrow B. After the coolant has cooled the membrane electrode assembly 12, the coolant is discharged from the coolant discharge passages 30b into the manifold chamber 68b of the coolant outlet manifold 60b (see FIG. 1).

In the first embodiment, the coolant inlet manifold 60a extends along the end plate 24a, in the longitudinal direction indicated by the arrow C. As shown in FIGS. 4 and 5, pillars 76a are provided at opposite ends in the longitudinal direction of the coolant inlet manifold 60a. The pillars 76a are fitted into the through holes 52a, 52b of the end plate 24a, and are connected to the manifold body 70a and to the connector 74a.

Thus, even if the end plate 24a becomes deformed in the longitudinal direction due to internal pressure within the fuel cell stack 10 (e.g., caused by a tightening load applied to the fuel cell stack 10, or by expansion of the solid polymer electrolyte membrane 34 due to an increase in the water amount), as a result of the pillars 76a being provided at opposite ends in the longitudinal direction of the coolant inlet manifold 60a, peeling off of opposite ends of the coolant inlet manifold 60a from the end plate 24a in the longitudinal direction can reliably be prevented. Thus, a desired sealing performance can be maintained, while suitably preventing cracks or the like from forming in the coolant inlet manifold 60a.

In the coolant outlet manifold 60b as well, similar to the case of the coolant inlet manifold 60a, due to the presence of the pillars 76b, peeling off of opposite ends of the coolant outlet manifold 60b from the end plate 24a in the longitudinal direction can reliably be prevented. Thus, a desired sealing performance can be maintained, while suitably preventing cracks or the like from forming in the coolant outlet manifold 60b.

Figure 6:
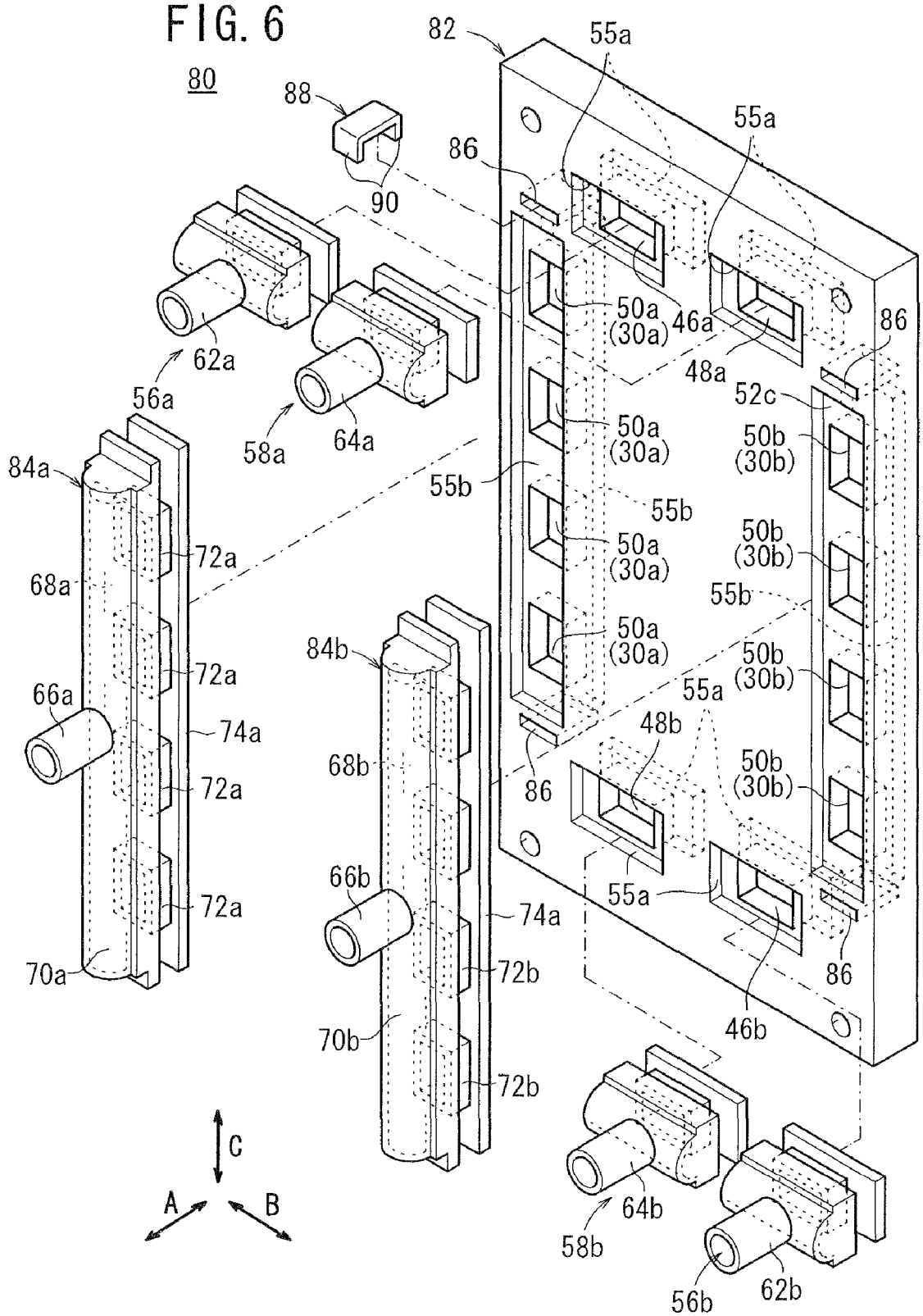
FIG. 6 is an exploded perspective view showing an end plate, a coolant inlet manifold, and a coolant outlet manifold of a fuel cell stack according to a second embodiment of the present invention.

FIG. 6 is an exploded perspective view, showing an end plate 82, a coolant inlet manifold 84a, and a coolant outlet manifold 84b of a fuel cell stack 80 according to a second embodiment of the present invention. Constituent elements that are identical to those of the fuel cell stack 10 according to the first embodiment are labeled using the same reference numerals, and detailed descriptions of such features have been omitted.

Figure 7:
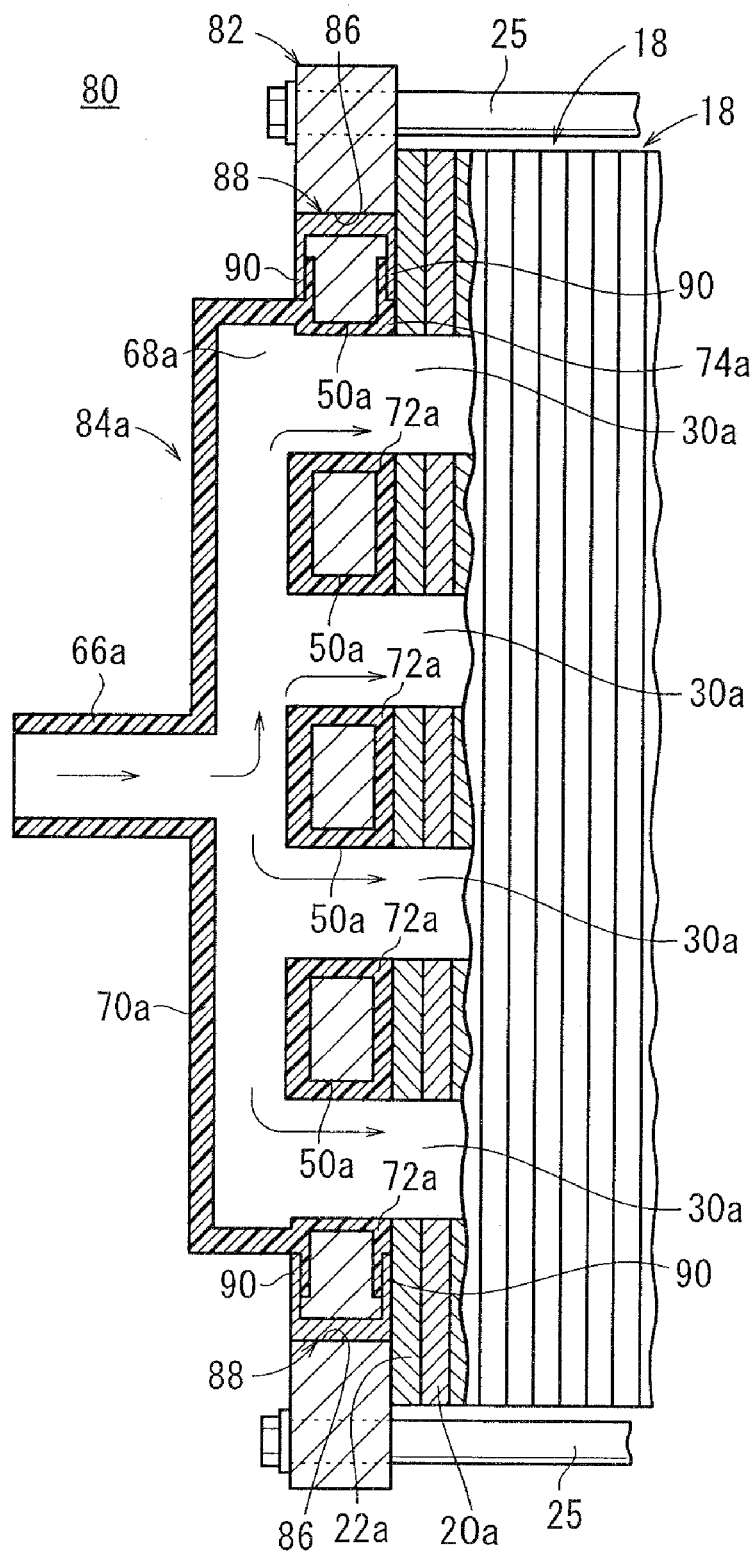
FIG. 7 is a cross sectional view showing the end plate and the coolant inlet manifold.

Openings 86 are provided adjacent to coolant inlets 50a and coolant outlets 50b, which are provided at opposite ends in a longitudinal direction of the end plate 82, as indicated by the arrow C. A reinforcement metal piece (reinforcement member) 88 is inserted into each of the openings 86. The reinforcement metal pieces 88 have claws 90 that protrude from both surfaces of the end plate 82, and are bent along both surfaces of the end plate 82, so as to hold the opposite ends of the coolant inlet manifold 84a and the opposite ends of the coolant outlet manifold 84b (see FIGS. 6 and 7).

In the second embodiment having the above structure, even if the end plate 82 is deformed in the longitudinal direction, since opposite ends in the longitudinal direction of the coolant inlet manifold 84a are held in place by the reinforcement metal pieces 88, peeling off of the opposite ends of the coolant inlet manifold 84a from the end plate 82 can reliably be prevented. Thus, a desired sealing performance can be maintained, while suitably preventing cracks or the like from forming in the coolant inlet manifold 84a.

While the invention has been particularly shown and described with reference to the preferred embodiments, it should be understood that variations and modifications can be effected thereto by persons skilled in the art without departing from the spirit of the invention as set forth in the appended claims.

What is claimed is:

1. A fuel cell stack formed by stacking a membrane electrode assembly and separators in a stacking direction, the membrane electrode assembly including a pair of electrodes and an electrolyte membrane interposed between the electrodes, the fuel cell stack including rectangular end plates provided at opposite ends in the stacking direction, wherein the end plate has opposed surfaces forming land surfaces, wherein passages that function at least as fluid supply passages or fluid discharge passages for a coolant or a reactant gas are formed along the end plates in a longitudinal direction, and extend through the fuel cell stack, the passages being formed within the land surfaces, the fuel cell stack comprising:
a resin manifold member connected to any of the passages, and extending along a land surface of one of the end plates in the longitudinal direction;
a reinforcement member provided on at least one end of the resin manifold member in the longitudinal direction, for preventing the resin manifold member from peeling off from the end plate; and
a connector having first and second opposed surfaces, wherein substantially the entire first surface of said connector is disposed in intimate facing contact with the opposed land surface of said one of the end plates, the reinforcement member being connected to the connector and the resin manifold member.

2. A fuel cell stack according to claim 1, wherein the reinforcement member includes a pillar fitted into a through hole formed in one of the end plates, and connected to the resin manifold member on both surfaces of one of the end plates.

3. A fuel cell stack according to claim 1, wherein the reinforcement member includes a reinforcement metal piece inserted into an opening passing through one of the end plates, and holding the resin manifold member by claws extending along both surfaces of one of the end plates.

4. A fuel cell stack according to claim 1, wherein the reinforcement member is provided at each of opposite ends of the resin manifold member in the longitudinal direction.

5. A fuel cell stack according to claim 1, wherein a plurality of passages are formed along the end plates in the longitudinal direction, and
the resin manifold member has a single manifold chamber extending in the longitudinal direction, and connected to each of the passages.

6. A fuel cell stack according to claim 1, wherein the passages are arranged along one of the end plates in the longitudinal direction, and include fluid supply passages provided at one of opposite ends in the lateral direction, and fluid discharge passages provided at the other of the opposite ends in the lateral direction; and
a plurality of resin manifold members are provided for both of the fluid supply passages and the fluid discharge passages, respectively.

* * * * *